United States Patent
Scherpa

(10) Patent No.: US 9,299,061 B2
(45) Date of Patent: Mar. 29, 2016

(54) AUGMENTED SCREEN SHARING IN AN ELECTRONIC MEETING

(75) Inventor: Josef Scherpa, Fort Collins, CO (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 13/491,704

(22) Filed: Jun. 8, 2012

(65) Prior Publication Data

US 2013/0212490 A1 Aug. 15, 2013

Related U.S. Application Data

(63) Continuation of application No. 13/369,573, filed on Feb. 9, 2012.

(51) Int. Cl.
*G06F 3/0481* (2013.01)
*G06Q 10/10* (2012.01)

(52) U.S. Cl.
CPC ..................... *G06Q 10/101* (2013.01)

(58) Field of Classification Search
None
See application file for complete search history.

(56) References Cited

U.S. PATENT DOCUMENTS

| | | | |
|---|---|---|---|
| 7,707,226 B1 * | 4/2010 | Tonse ............................. | 707/796 |
| 7,992,085 B2 | 8/2011 | Wang-Aryattanwanich et al. | |
| 8,341,174 B2 * | 12/2012 | Hjelm ..................... | H04L 67/24 707/765 |
| 8,364,666 B1 * | 1/2013 | Katzir ................... | H04L 63/306 707/723 |
| 9,076,154 B1 * | 7/2015 | Song ...................... | G06Q 30/02 |
| 2003/0028390 A1 * | 2/2003 | Stern et al. ........................ | 705/1 |
| 2004/0075686 A1 | 4/2004 | Watler et al. | |
| 2004/0220925 A1 | 11/2004 | Liu et al. | |
| 2005/0060365 A1 | 3/2005 | Robinson et al. | |
| 2005/0193335 A1 | 9/2005 | Dorai et al. | |
| 2008/0071739 A1 | 3/2008 | Kumar et al. | |
| 2008/0086356 A1 | 4/2008 | Glassman et al. | |
| 2008/0133501 A1 | 6/2008 | Andersen et al. | |
| 2008/0195945 A1 | 8/2008 | Vaughan et al. | |
| 2008/0222246 A1 | 9/2008 | Ebling et al. | |
| 2009/0138495 A1 * | 5/2009 | Kalaboukis et al. .......... | 707/102 |
| 2009/0222742 A1 | 9/2009 | Pelton et al. | |
| 2009/0239552 A1 | 9/2009 | Churchill et al. | |
| 2009/0254840 A1 * | 10/2009 | Churchill et al. ............. | 715/753 |
| 2009/0319569 A1 | 12/2009 | Parks | |

(Continued)

FOREIGN PATENT DOCUMENTS

| CN | 101018137 A | 8/2007 |
|---|---|---|
| CN | 101447954 A | 6/2009 |
| CN | 101896926 A | 11/2010 |

OTHER PUBLICATIONS

International Search Report and Written Opinion in related International patent application No. PCT/IB2013/050594, mailed on Jun. 27, 2013; 8 pages.

(Continued)

*Primary Examiner* — Hien Duong
(74) *Attorney, Agent, or Firm* — Schmeiser, Olsen & Watts LLP

(57) ABSTRACT

Described are methods for providing contextually relevant data to participants of an electronic communication. A screen sharing session is established between a plurality of participants of the electronic communication. A set of contextual relevance data is determined between contents of the screen sharing session, at least one of the participants, and external data related to the at least one of the participants. The screen sharing session is changed to include the contextual relevance data.

17 Claims, 6 Drawing Sheets

(56) References Cited

U.S. PATENT DOCUMENTS

| | | | |
|---|---|---|---|
| 2010/0036929 A1* | 2/2010 | Scherpa | G06Q 10/10 709/207 |
| 2010/0042469 A1 | 2/2010 | Chandrasekar et al. | |
| 2010/0082398 A1 | 4/2010 | Davis et al. | |
| 2010/0145976 A1 | 6/2010 | Higgins et al. | |
| 2010/0241663 A1* | 9/2010 | Huang et al. | 707/770 |
| 2011/0010641 A1 | 1/2011 | Wolff et al. | |
| 2011/0022967 A1* | 1/2011 | Vijayakumar et al. | 715/753 |
| 2011/0055295 A1* | 3/2011 | Bhide | G06F 17/30091 707/822 |
| 2011/0066619 A1* | 3/2011 | Perantatos et al. | 707/739 |
| 2011/0202854 A1* | 8/2011 | Chan et al. | 715/762 |
| 2011/0213655 A1* | 9/2011 | Henkin et al. | 705/14.49 |
| 2011/0252366 A1 | 10/2011 | Balasubramanian et al. | |
| 2011/0270923 A1* | 11/2011 | Jones et al. | 709/204 |
| 2011/0271205 A1* | 11/2011 | Jones et al. | 715/753 |
| 2011/0271206 A1* | 11/2011 | Jones et al. | 715/753 |
| 2011/0271207 A1* | 11/2011 | Jones et al. | 715/753 |
| 2011/0271208 A1* | 11/2011 | Jones et al. | 715/753 |
| 2011/0271210 A1* | 11/2011 | Jones et al. | 715/753 |
| 2011/0302247 A1 | 12/2011 | Narayanan et al. | |
| 2012/0030289 A1 | 2/2012 | Buford et al. | |
| 2012/0036452 A1* | 2/2012 | Coleman | G06F 21/55 715/751 |
| 2012/0059842 A1* | 3/2012 | Hille-Doering | G06F 17/3064 707/769 |
| 2012/0198328 A1* | 8/2012 | Kiley et al. | 715/234 |
| 2012/0246240 A1 | 9/2012 | Hanlon | |
| 2012/0271719 A1* | 10/2012 | Straley et al. | 705/14.66 |
| 2012/0290974 A1 | 11/2012 | Doig et al. | |
| 2012/0304076 A1 | 11/2012 | Gutcher et al. | |
| 2012/0304079 A1* | 11/2012 | Rideout et al. | 715/758 |
| 2013/0067384 A1* | 3/2013 | Bier | 715/779 |
| 2013/0132566 A1 | 5/2013 | Olsen et al. | |
| 2013/0254651 A1* | 9/2013 | Lee | 715/234 |
| 2013/0298030 A1* | 11/2013 | Nahumi et al. | 715/733 |
| 2014/0033049 A1* | 1/2014 | Fitzpatrick | 715/733 |

OTHER PUBLICATIONS

Non-Final Office Action in related U.S. Appl. No. 13/369,573, mailed on Jul. 15, 2014; 14 pages.

Final Office Action in related U.S. Appl. No. 13/369,573, mailed on Nov. 5, 2014; 14 pages.

Non-Final Office Action in related U.S. Appl. No. 13/369,573, mailed on May 1, 2015; 18 pages.

Final Office Action in related U.S. Appl. No. 13/369,573, mailed on Sep. 25, 2015; 16 pages.

* cited by examiner

AUGMENTED SCREEN SHARING IN AN ELECTRONIC MEETING

RELATED APPLICATION

This application is a continuation application of co-pending U.S. patent application Ser. No. 13/369,573, filed Feb. 9, 2012, titled "Augmented Screen Sharing in an Electronic Meeting", the entirety of which is incorporated by reference herein.

FIELD OF THE INVENTION

The present invention relates generally to electronic meeting environments, and more specifically, to methods that determine a contextual relevance of shared content among participants of an electronic meeting.

BACKGROUND

Screen sharing tools having well-known uses, for example, in web conferencing applications. A screen sharing feature allows a presenter to share the display of an entire display screen, or a region of the screen, to remote participants. The screen shared appears as the same image to all participants. However, data conveyed by the shared image may have a particular contextual relevance to different viewers. For example, a meeting time shown in a calendar displayed at the presenter's computer and shared with other participants does not accurately reflect the time at a viewer in a different timezone. A participant at a different timezone may not find the displayed meeting time to be beneficial since it does not reflect the participant's local time.

BRIEF SUMMARY

In one aspect, provided is a computer-implemented method for providing contextually relevant data to participants of an electronic communication. The computer-implemented method comprises establishing a screen sharing session between a plurality of participants of the electronic communication; determining contextual relevance data between contents of the screen sharing session, at least one of the participants, and external data related to the at least one of the participants; and augmenting the contents of the screen sharing session to include the contextual relevance data.

In another aspect, provided is a computer-implemented method for determining a contextual relevance between shared content of an interactive communication, participants of the interactive communication, and external information related to the participants. The computer-implemented method comprises determining a type of content object from the shared content; communicating with a data source to identify external data that is contextually relevant to at least one participant of the participants and the type of content object; outputting the contextually relevant external data from the data source to an electronic display of the participants; and displaying the contextually relevant external data at electronic display of the participants.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
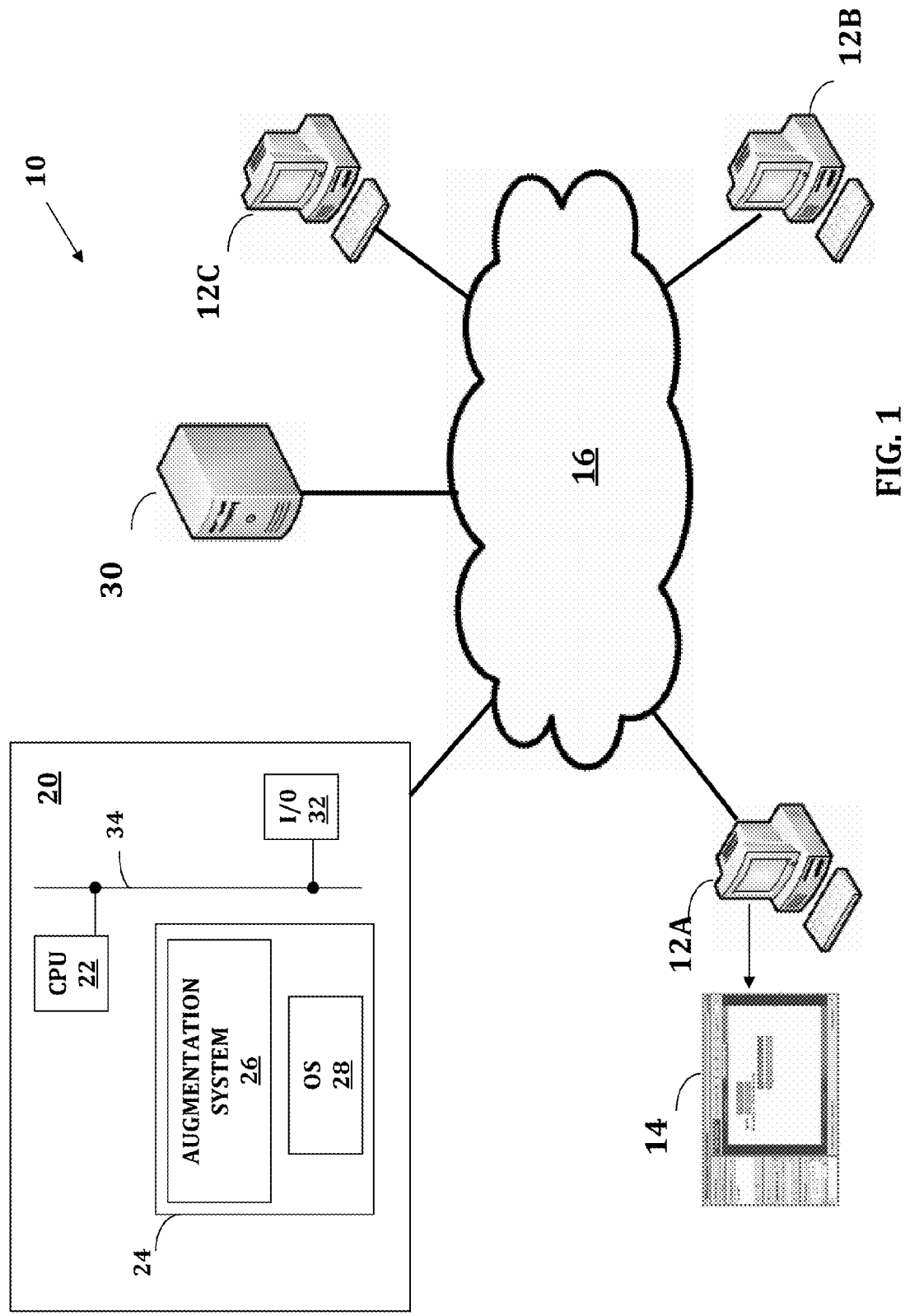
FIG. 1 is an illustration of an electronic communications environment in which embodiments of the present inventive concepts can be practiced.

In the following description, specific details are set forth although it should be appreciated by one of ordinary skill that the systems and methods can be practiced without at least some of the details. In some instances, known features or processes are not described in detail so as not to obscure the present invention.

Existing technologies are readily available for detecting and augmenting content on a user's computer. For example, Lotus Notes® collaboration software provided by International Business Machines Corporation includes a "live text" feature, which can recognize specific patterns of text in a document and allow a user to perform various actions by selecting the text. For example, a zip code in an email message can be detected and modified, e.g., underlined or highlighted. The viewer can select the zip code on the computer, which opens a widget linked to the live text, i.e., the zip code. The viewer can then select an action, for example, to view a map corresponding to the zip code.

In an emeeting or other interactive communication, screen sharing may be used so that the participants can share display content with each other. The shared content may have contextual relevance to some or all of the participants. For example, in a six-party online conference, shared content may cause a conflict with three participants, but not with the other three participants. Here, a screen displaying a "proposed time for a meeting tomorrow" could lend itself to detection for contextual relevance to the participants. Similar to the abovementioned live text feature, additional systems can be searched for related information based on the identification of target data.

The present inventive concepts can compare results from other data systems with data available for the current participants consuming the content displayed at the emeeting. The views of each participant can be augmented individually to provide additional information, for example, with a text overlay near the proposed meeting time in the display. One viewer can observe an overlay message stating that the meeting time is acceptable, while another viewer observes an overlay message stating that he has a conflict. The other viewer can then choose to speak up or chat in the meeting to alert the others of a conflict based on the additional information provided to him in the form of overlay messages while he views the shared presentation.

Accordingly, the shared content may be directly relevant to one participant, but it may also benefit the other participants to know that it is relevant to this participant. For example, in the previous example, the presenter of a screen sharing application may see an augmented message stating that there is a conflict for two other participants in the emeeting. Without the augmentation feature, it would be difficult for a participant to know the relevance of how the shared content pertains to them, or how it pertains to other participants. There may be exceptions or conflicts regarding the conflict with respect to one or more participants, and much manual work may be required to identify such conflicts. In the previous example, the users can pay attention to the meeting, while a service runs in the background to provide the augmentation feature where applicable.

Embodiments of the present inventive concepts provide an electronic communication system in which content shared with multiple recipients is analyzed electronically to determine whether the content is to the recipients of that content. External data sources can be accessed to verify that the content is contextually relevant, and additional information can be retrieved from the external data sources. The content can be augmented according to the contextually relevant information using one or more different visualization techniques. The shared screen view of the conference participants and/or the presenter can be augmented by adding information to the content that is derived from the contextually relevant information of the participants and the presenter, respectively. The augmentation can be unique to each participant, and can include contextual information regarding themselves, or others in or external to the meeting. The augmented information can include text, graphics/multimedia, or actions from other data systems.

The present inventive concepts permit information to be augmented on the same screen depending on a desired "focus lens." An example of the lens is a toggle option to augment a viewer's display with contextual information relative to the user, distinguished from a toggle option to augment the viewer's display with contextual information relevant to other participants, or to other people "on the viewer's team" not participating in the emeeting.

FIG. 1 is an illustration of an electronic communications environment 10 in which embodiments of the present inventive concepts can be practiced. The electronic communications environment 10 can be an emeeting environment. In other embodiments, the electronic communications environment 10 includes any electronic communication between two or more participants, including but not limited to emeetings, chat rooms, voice over IP conferencing, web conferencing, email, text, or other electronic communication that exchanges messages between users, online discussion forums or blogs, social networks, or other environment where two or more users participate in an interactive exchange.

The electronic communications environment 10 includes participant computers 12A, 12B, 12C (generally, 12) in electronic communication with a meeting server 20 via a network 16 The meeting server 20 can include an emeeting server, an email server, or related application server, or be in electronic communication with an emeeting server, an email server, or related application server via the network 16.

The participant computers 12 can be desktop computers, laptop computers, server systems, handheld devices such as a personal digital assistant (PDA) or smartphone, a computer terminal, or a combination thereof, or other electronic device having a display screen that presents screen sharing contents to a viewer. The participant computers 12 can be geographically separate from each other, and can communicate with the meeting server 20 via the network 16, for example, a public switched telephone network (PSTN), a mobile communications network, a data network, such as a local area network (LAN) or wide area network (WAN), or a combination thereof, or other communication networks known to those of ordinary skill in the art. The meeting server 20 and/or one or more participant computers 12 can also communicate with one or more information sources, for example, third party data sources such as a social network or information directory, or other data source comprising contextual information.

Participant computers 12 can join a conference, online session, and the like by registering with the meeting server 20, for example, logging into the meeting server 20, or selecting a prearranged link provided to the participant computers 12. The participant computers 12 can be configured with a screen sharing software application, or by using a screen sharing service to share a web browser or other displayed application.

The meeting server 20 includes a processor such as a CPU 22, a memory 24, and input/output (I/O) logic 32, for example, a network interface card (NIC), which communicate with each other via a data/control bus and/or data connector, for example, a peripheral component interconnect (PCI) bus. The I/O logic 32 can include one or more adaptors for communicating with the network 16.

The memory 24 can include volatile memory, for example, random access memory (RAM) and the like, and/or non-volatile memory, for example, read-only memory (ROM), flash memory, and the like. The memory 24 can include removable and/or non-removable storage media implemented in accordance with methods and technologies known to those of ordinary skill in the art for storing data. Stored in the memory 24 can include program code, such as program code of an operating system (OS) 28 executed by the processor 22.

The memory 24 also includes a augmentation system 26. In an embodiment, the augmentation system 26 can scan the content of a screen sharing session, for example, a document 14 provided by a participant computer 12A to the other participant computers 12B, 12C. The augmentation system 26 can determine one or more contextual relationships between the results of the scan and the users at the participant computers 12, for example, applying one or more techniques for identifying contextual relationships. Such relationships can vary according to factors such as participant roles, industry, meeting topics, and the like. Contextual data can be received from one or more remote data sources, such as a server 30. This data can be used to determine which content to augment, and the manner in which it is augmented, for example, highlighted. The augmentation system 26 can overlay or otherwise modify the displayed content 14 with data generated from the determined contextual relationships, which may be relevant to the viewers at the participant computers 12.

In an embodiment, controls can be made available to meeting moderators and/or participants to activate or inactivate the augmentation system 26 in an interactive communication that includes the meeting server 20. For example, a moderator of an emeeting can enable or disable the feature using a simple onscreen toggle button at the moderator screen's user interface.

Figure 2:
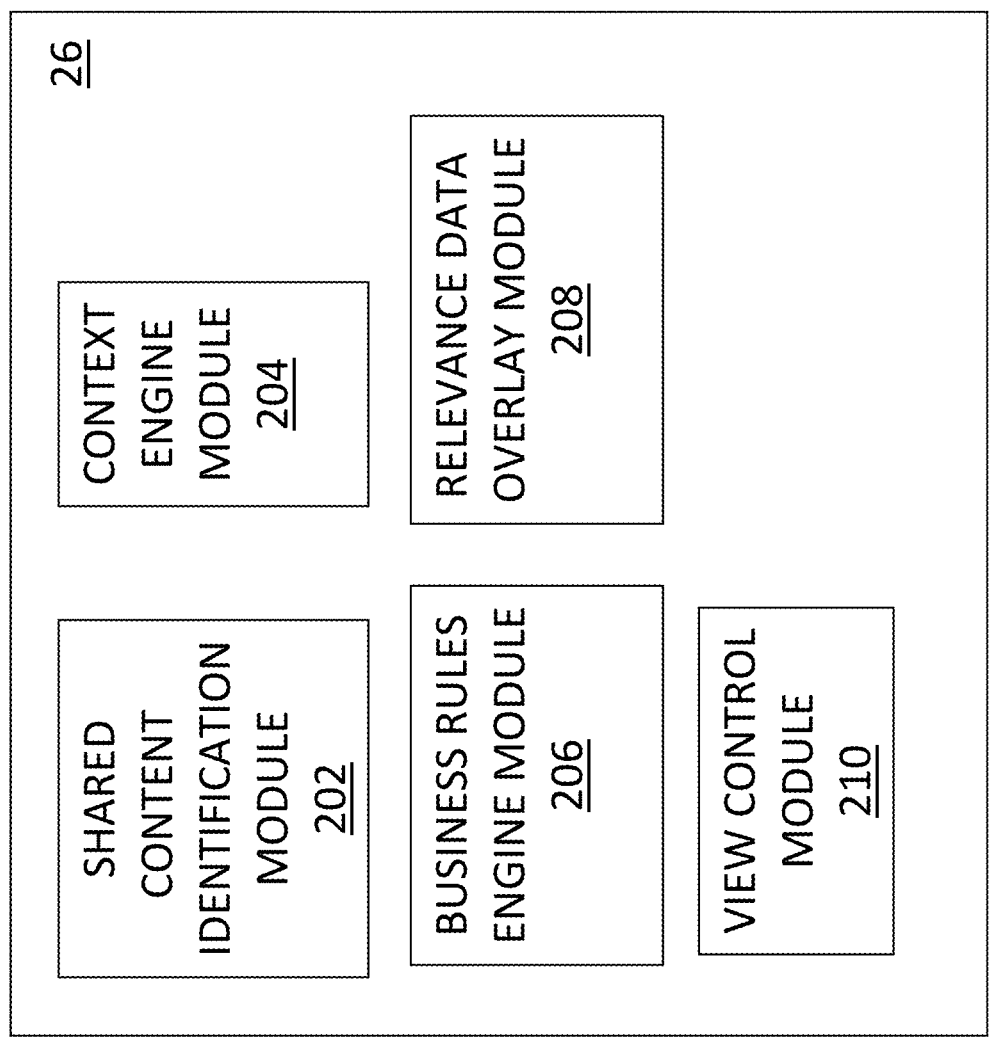
FIG. 2 is a block diagram of the augmentation system of FIG. 1, in accordance with an embodiment.

FIG. 2 is a block diagram of the augmentation system 26 of FIG. 1, in accordance with an embodiment. Although the augmentation system 26 is shown at FIG. 1 as being part of a common hardware platform, some or all of the elements of the augmentation system 26 can be at other hardware platforms. The augmentation system 26 can include a shared content identification module 202, a context engine module 204, a rules engine module 206, a relevance data overlay module 208, and a view control module 210.

The shared content identification module 202 can scan a screen sharing session of identifiable content. The shared content can be scanned by applying a system comprising character recognition software, for example, object character recognition (OCR), which extracts text from images generated from the screen sharing session. The content can be preloaded so that the shared content identification module 202 can scan the content for relevant data prior to an interactive communication, for example, an emeeting. Alternatively, the content can be scanned during an interactive communication. The scan results can be extracted and stored at a data repository (not shown) such as a database.

The context engine module 204 can determine any contextual relevance between the content scan results and the viewers of the content. For example, the context engine module 204 can be configured to identify content of a specific type that occurs frequently in shared electronic communications within the organization to which the participants are associated, for example, dates and times, names, addresses, and so on.

The context engine module 204 can analyze the scanned content by checking other data sources to determine any contextual relevance between the content type and the participants receiving the content, for example, via a screen sharing session.

Methods of determining contextual relevance such as those described herein can be applied via the meeting server 20 for distribution to the participant computers 12. In an embodiment, users can apply one or more techniques or rules which are defined according to the users' needs. The augmentation system 26 perform a complex analysis of data shared in the emeeting by defining a set of rules for identifying target data such as text-object recognition of particular keywords, for example, times, zip codes, locations, etc. One or more applicable rules from the defined set of rules can be identified for validating this information against participants, for example, a participant's actual location. External information sources are identified and queried for contextual relationship data related to the participants, for example, using a keyword-based search. Another set of rules can be defined for returning data from the external information sources and how the data is displayed at the participants' computers, for example, as a visual layer on top of the shared content at a participant's display. The data displayed may vary, depending on the participant.

A technique can be provided to identify content of a specific type that occurs frequently in shared communications within an organization, such as product names, job titles, and so on. Another technique can include comparing a time displayed on a shared screen with a participant's electronic calendar for establishing an overlay that includes a time that is adjusted according to the participant's location, for example, shown at FIG. 6. Another technique can include analyzing a participant's electronic task list, action items, or related bulleted lists, and cross-referencing them with participants known in other task systems to determine whether a participant is available for being assigned a task.

The rules engine module 206 defines from the extracted content text if, how, and/or where to augment the screen shared image with an overlay of additional information pertaining to the recognized content provided by the other data sources. The identified content can be analyzed against the rules pertaining to the context of one or more viewers. For example, if the screen is showing a meeting time for the future, and if participants have a conflict at that time, then the shared screen is augmented with a conflict alert message. This message can be positioned at or near the location of the displayed meeting time. One or more rules can be applied to the content to determine a region of the shared screen that is to be augmented.

For example, a presenter at participant computer 12A can send a meeting agenda in a screen sharing format. The meeting agenda can include a meeting location and a meeting time. The viewer at participant computer 12B may not know the location of the presenter 12A. A meeting time may have no meaning to the viewer at participant computer 12B if the viewer is in a different timezone than the presenter 12A. The context engine module 204 can determine the timezone of each participant computer 12. The business rule can be established that "if a meeting time is displayed, and participants have conflicts, then display an augmented message near the meeting time to participants to indicate the conflict." The displayed contextual information, e.g., a timezone, can be modified depending on the viewer. For example, the viewer at participant computer 12B may wish to see how the presented content is related to different selected participants from the emeeting participant list. A view toggle can be implemented for a participant to view augmented information providing information relevant to themselves, or to other participants, or even to non-participants.

The relevance data overlay module 208 can modify the shared content to include contextually relevant information from the analysis results generated by the context engine module 204. Referring to the previous example, the relevance data overlay module 208 can output the results as an overlay indicating the local time for the participant 12B.

In another example, the context engine module 204 can analyze text retrieved by the shared content identification module 202 from a scanned spreadsheet, then identify text in a product column of the spreadsheet, cross-reference products determined from the text to those meeting participants who specialize in that product, then cross-reference a scheduled time to demonstrate the product to the participants' calendars. Cross-referencing can be performed according to rules defined in a computer program, where shared content is scanned for keywords, identified keywords are then used to query other data systems along with current participant names, and results from the external data system are returned for the matched keyword pertaining to participants. The shared screen can be augmented at or near the location of the keyword.

The view control module 210 can provide recipients with the ability to view the contextual relevance to themselves, or to one or more other participants.

Figure 3:
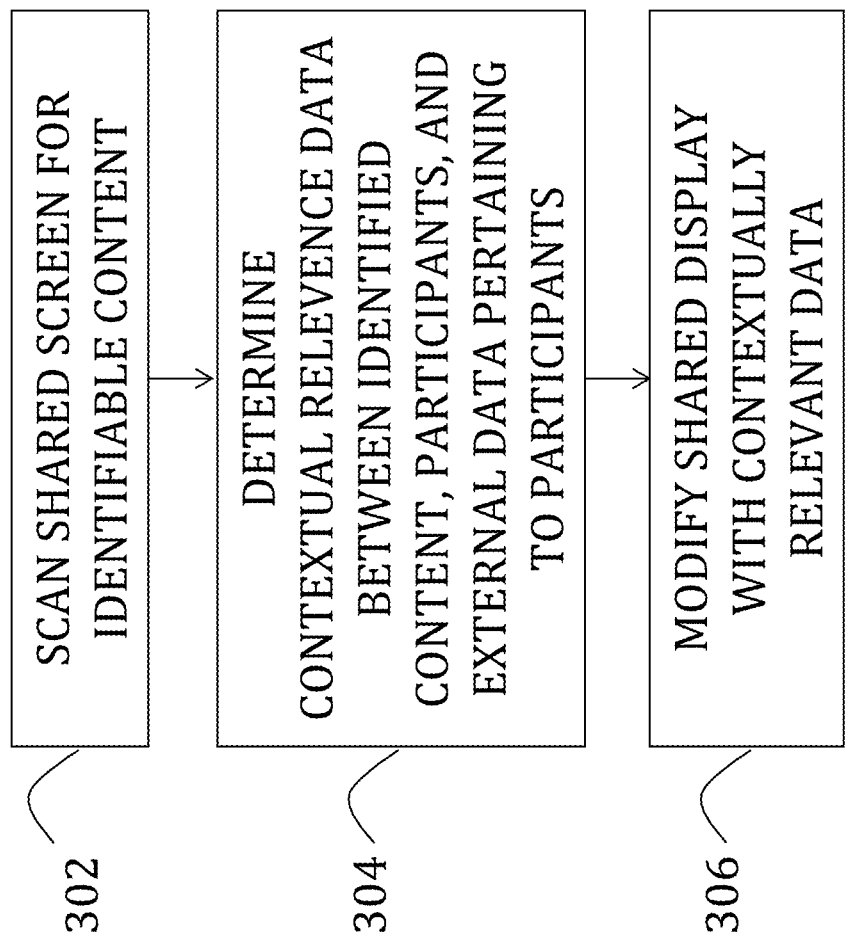
FIG. 3 is a flowchart of a method for screen sharing, in accordance with an embodiment.

FIG. 3 is a flowchart of a method 300 for screen sharing, in accordance with an embodiment. In describing the method 300, reference is also made to elements of FIGS. 1 and 2. Some or all of the method 300 can be governed by instructions that are stored in a memory, e.g., the memory 204 of the meeting server shown in FIG. 1, and can be executed by a processor, e.g., the processor 202 of the meeting server 20 of FIG. 1.

At block 302, some or all of a display screen is scanned for shared content. The screen shared content can be for an emeeting, for example, described with reference to FIGS. 1 and 2, or alternatively, can be for an email exchange, an online chat session, or other interactive communication that includes screen sharing and the like. The scanned content can be anything displayed on a display screen that can be captured by a screen sharing tool. For example, an email message, spreadsheet, graph, or other document that includes text, characters, or graphical data. The scanned content can pertain to a presenter who initiates sharing with other participants. The shared content can be scanned by object character recognition (OCR) tools or other screen scouring technology.

At block 304, contextual relevance data is determined from the results of the scanned content and data related to the users of the scanned content at participant computers 12. The context engine module 204 described herein can determine contextual relevance, for example, by communicating with other data sources. For example, referring to FIGS. 1 and 2, the context engine module 204 can communicate with a calendaring system to verify participant availability regarding a meeting time displayed as part of the shared content 14.

In an embodiment, actions are provided to interact with participants or content according to the relationship between the participants and/or the content. For example, if the augmented message alerts a user that they have a conflict, clicking on the alert may display a menu of options including "check calendar" to open a separate calendar application to view the meeting information that the user has scheduled at that time.

At block 306, the shared content can be modified to include information related to the determined contextual relevance between the results of the scanned content and the users of the scanned content. For example, the contextually relevant information can be overlaid in proximity to the shared content at the user's display according to the rules engine module 206. The original shared content and/or participant identifications can be highlighted or otherwise distinguished from the contextually relevant information. The contextually relevant information can be displayed in close proximity to the original shared content.

Figure 4:
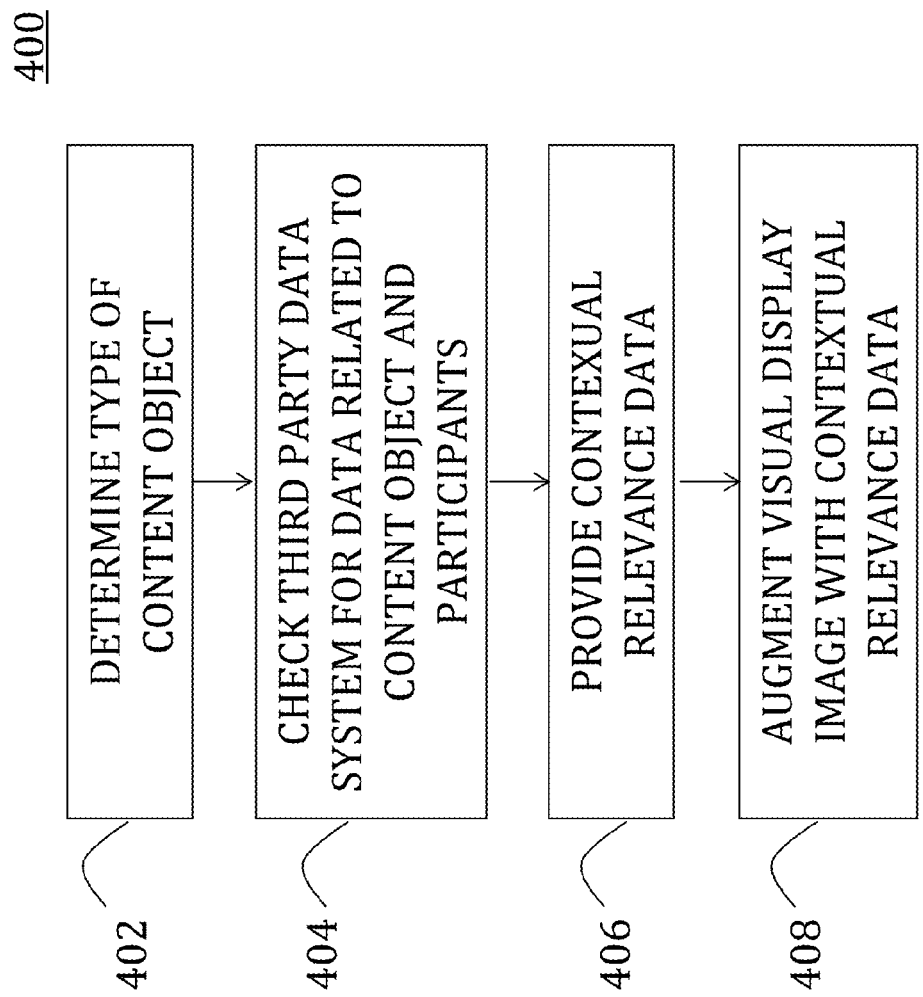
FIG. 4 is a flowchart of a method for augmenting a visual display, in accordance with an embodiment.

FIG. 4 is a flowchart of a method 400 for augmenting a visual display, in accordance with an embodiment. In describing the method 400, reference is also made to elements of FIGS. 1-3. Some or all of the method 400 can be performed at the context engine module 204, a participant computer 12, and/or a remote client or server. Some or all of the method 400 are governed by instructions that are stored in a memory, e.g., the memory 204 shown in FIG. 1, and can be executed by a processor, e.g., the processor 202 shown in FIG. 1.

At block 402, a type of content object is determined. For example, the content object can be determined to be a zip code, a name, or other recognizable sequence. Screen scouring technology such as OCR and the like can be applied to screen sharing content to determine the content from which the object types can be established. Alternatively, the content can be preloaded at a meeting server 20 and be readily available for analysis by the context engine module 204.

At block 404, a third party data system, for example, server 30 shown in FIG. 1, is checked for data related to the determined type of content and the participants 12 receiving the content, for example, in the form of a visual display. The data can be used by the context engine module 204 to determine a contextual relevance between the results of the scanned content and the participants 12.

At block 406, the contextual relevance data is output, for example, provided from the third party data system 30 to the context engine module 204. The augmentation system 26 can relate data between different data sources. For example, the augmentation system 26 can identify a time of day from the content and perform a comparison with a time of day relevant to a particular viewer. The system 26 can infer from a difference in times that the time of day displayed at the viewer's screen needs to be modified to include the "corrected" time of day, for example, shown at overlay 608 at FIG. 6.

At block 408, the visual display image displaying the shared content is augmented to include the contextual relevance data. The augmented source content can be presented in a unique format to each participant computer 12. For example, participant computers 12A and 12B can be located at different timezones. Here, participant computer 12A can receive an overlay that indicates the local timezone of participant computer 12A, while participant computer 12B can receive a different overlay, namely, an overlay that indicates the local timezone of participant computer 12B.

Figure 5:
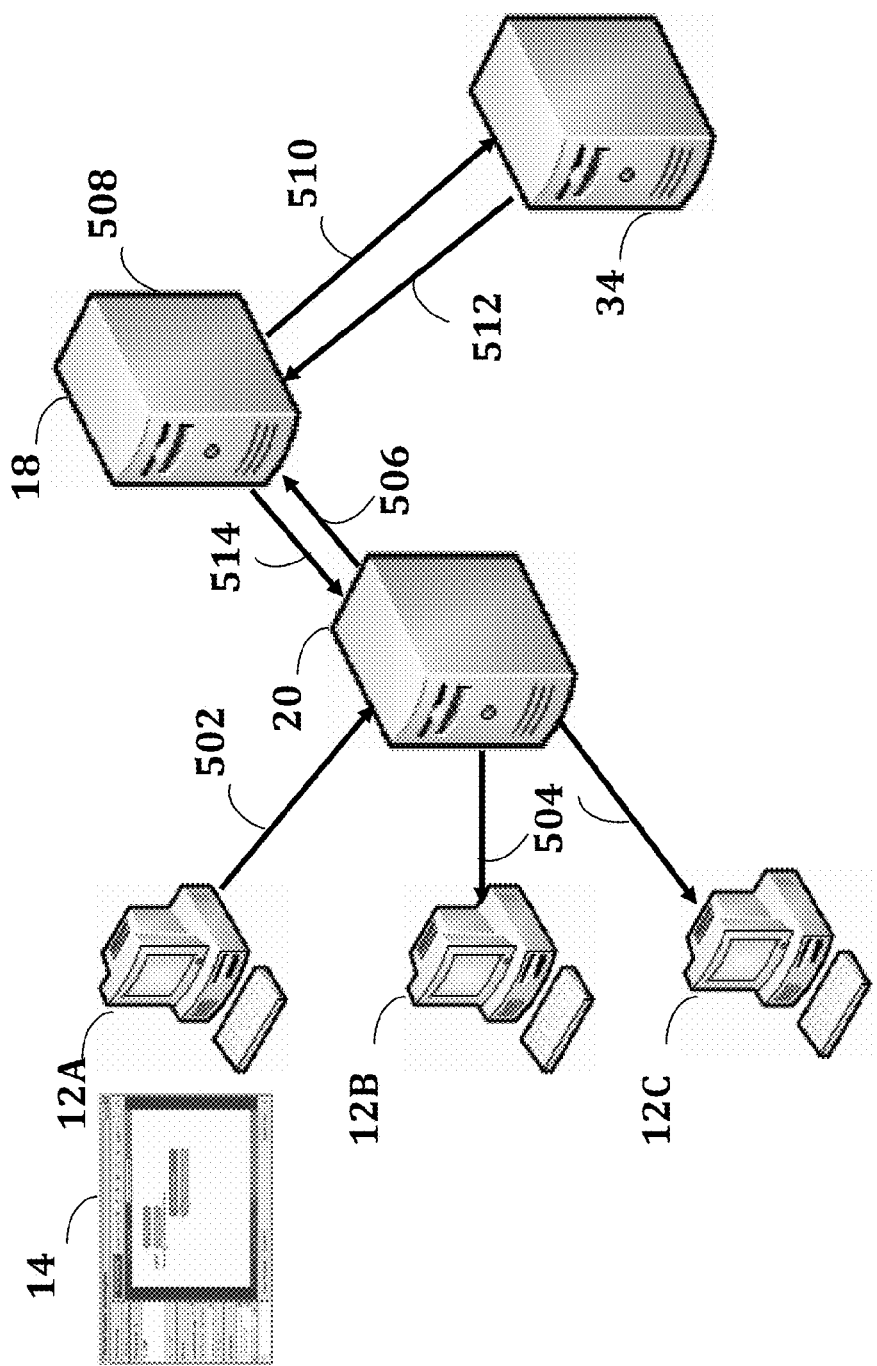
FIG. 5 is an illustration of flow paths between emeeting participants, a meeting server, a context engine server, and a third party data system, in accordance with an embodiment.

FIG. 5 is an illustration of flow paths 502-514 between a plurality of participant computers 12, a meeting server 20, a context engine server 18, and a third party data system 34, in accordance with an embodiment. The emeeting participants 12 are in communication with the meeting server 20, for example, during an emeeting or other interactive communication. The context engine server 18 and the meeting server 20 can be part of the same hardware platform, or as shown in FIG. 5, can be separate hardware platforms.

In this illustrative example, an emeeting participant 12A presents at flow paths 502, 504 a content source 14 to the other participant computers 12B, 12C in a screen sharing session. The content source 14 can be a document, slide presentation, graph, or other visual representation that can be presented to, and shared by, viewers at the participant computers 12. The content source 14 can be displayed as an image or related visual format at the participant computers 12B, 12C. This can be performed prior to or during a scheduled interactive communication such as an emeeting, or "preloaded" prior to the emeeting so that it is readily available for the other participants 12B, 12C of the emeeting.

The meeting server 20 can scan the content source 14 according to the embodiments described herein and output at flow path 506 the scanned results of the content source 14 to the context engine server 18. Alternatively, the meeting server 20 can output the content source 14 to the context engine server 18 server, which scans the content.

The context engine server 18 analyzes 508 the scanned content. Accordingly, the context engine server 18 can recognize the content object as being of a particular type. The content engine server 18 can communicate with a third party data system 34 as shown at flow path 510 to cross-reference this data with participants having a contextual relationship with the data. The third party data system 34 can output as shown at flow path 512 additional data related to the contextual relationship to the context engine server 18.

The context engine server 18 can augment the visual display image showing the content to the participants, and forward the augmented source content at flow path 514 to the participant computers 12. Each participant can receive a unique view? For example, if one participant is in one time zone and another participant timezone, each participant can see a unique view of his or her timezone. This information can be shared with multiple participants.

An illustrative example is described as follows. A sales team with members around the world meets weekly in an emeeting to review a standardized table consisting of three columns, entitled "Prospective Client," "Product Interested," and "Scheduled Product Demo Call." The table can be configured in a slide to include text populating one or more of the three columns. The table can be uploaded prior to the scheduled emeeting.

The context engine server 18 identifies the text in the "Product Interested" column of the table. The context engine server 18 can communicate with the third party server 34 to determine which participants 12 specialize in the product identified from the text in the "Product Interested" column. Similarly, the demonstration times can be identified from text in the "Scheduled Product Demo Call" column of the table, and the context engine server 18 can determine a contextual relationship by cross-referencing the identified scheduled demonstration time to the participants' calendars, for example, by communicating with the third party server 34, or with a different information source. Cross-referencing can be performed according to techniques described herein.

The screen shared image of the table displayed to the participants 12B, 12C can be modified to show which participants are available to handle the client call based on the determined contextual relationship data. Additionally, one or more participants can be selected and the image can be augmented to show which calls can be covered by those selected participants. In this example, the sales team can effectively discuss which members to assign the client calls without requiring the participants to manually check their calendars, or announce that they can support a particular product during the call.

Figure 6:
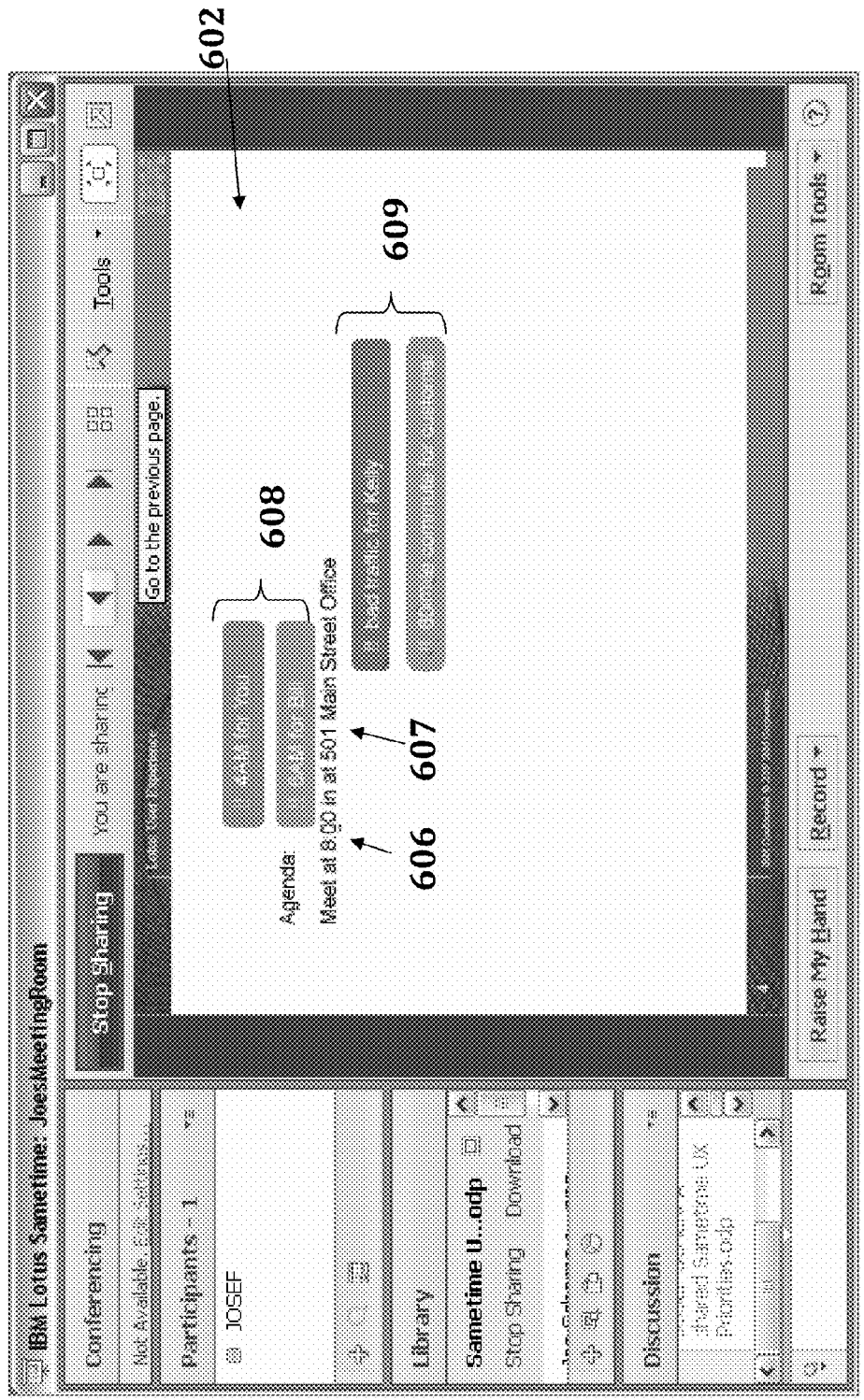
FIG. 6 is a screenshot of an augmented visual display image, in accordance with an embodiment.

FIG. 6 is a screenshot 600 of an augmented visual display image, in accordance with an embodiment. In describing the screenshot 600, reference is made to elements of FIGS. 1-5.

The display area 602 of the screenshot 600 includes content generated by a presenter, for example, at participant computer 12A which is shared with participant computers 12B and/or 12C.

The display area content includes specific content that has contextual relevance to the user at participant computer 12B and/or 12C viewing the display area 602 shared by the presenter at participant computer 12A. In particular, a meeting time 606 and location 607 are relevant to the viewer. The augmentation system 26 can augment the display area 602 to include overlays 608 corresponding to the meeting time 606. In particular, the viewer's local time (4 AM) and another participant's (Bill) local time (6 AM) are overlaid at the display area 602 in a region near the meeting time 606 of the shared content. Similarly, other overlay data 609 such as traffic conditions and commuting times of other participants (Kelly, customer) are displayed, providing the viewer insight to how the content pertains to the viewer or other participants. The manner in which the overlay data is presented to the viewer can be established by the rules engine module 206 of the augmentation system 26.

In some applications, content may have a contextual relationship with the presenter that the viewer is not able to determine. For example, the presenter 12A may only share a portion of the screen 14, for example, the body of an email message. However, the address header of the email message which ordinarily shows the full name of the sender is not displayed. In this example, the screen can be modified for the viewers at participant computers 12B, C so that an overlay listing the full name is displayed. In order to determine the full name, it would require a rule to be in operation in this context. For example, an email message can be presented, and scanned for names or other relevant text. Short names can be identified from the shared image. A communication can be established with an email application running on presenter's machine to determine full name record of sender. In some embodiments, the presenter view can be augmented based on the context of the viewer, either for individual viewers, or collectively for all viewers, or predefined groups of viewers. A bidirectional channel can be generated to augment the screen of the presenter, to indicate a context for a single viewer or multiple viewers as the context pertains to specific content on the presenter's screen 14.

While reference is made throughout to emeeting-related applications, other embodiments can include applications that relate to the dynamic processing of presentation data. Such applications can generate alternative relevant substantive views based on the content related to instant message meetings, social networks, or other collaborate environments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A computer-implemented method for providing contextually relevant data to participants of an electronic communication, comprising:
    establishing a screen sharing session between a first participant and a second participant;
    determining contextual relevance data, using one or more rules, between shared contents of the screen sharing session, the participants, and external data related to at least one of the participants, where the contextual relevance data includes data related to a contextual relationship between a result of the scan of the screen sharing session and at least one of the first and second participants, and a modification of the shared contents and data related to a contextual relationship between a result of the scan of the screen sharing session and at least one of the first and second participants;
    augmenting the screen sharing session to display first participant augmented information which includes both the shared contents and contextual relevance data that is relevant to the first participant;
    augmenting the screen sharing session on a computer screen of the second participant to display second participant augmented information which includes both the shared contents and contextual relevance data that is relevant to the second participant and different than the contextual relevance data that is relevant to the first participant; and
    displaying at a location on a computer screen of the first participant, the contextual relevance data that is relevant to the second participant,
    wherein the location of the displayed contextual relevance data is determined by the one or more rules.

2. The computer-implemented method of claim 1, wherein the electronic communication includes at least one of an online meeting, a chat room, a voice over IP conferencing session, a web conferencing session, an email exchange, a text messaging exchange, a real-time or near real-time document exchange, an online discussion forum, a blog, and a social network interaction.

3. The computer-implemented method of claim 1, further comprising:
    scanning the screen sharing session to identify the contents of the screen sharing session.

4. The computer-implemented method of claim 3, wherein the screen sharing session is scanned for at least one of character recognition and object recognition.

5. The computer-implemented method of claim 1, wherein determining contextual relevance data includes validating the contents of the screen sharing session with the external data.

6. The computer-implemented method of claim 1, further comprising:
    applying the one or more rules that define the manner in which the contents of the screen sharing session are augmented at a display screen.

7. The computer-implemented method of claim 6, wherein the one or more rules can be applied to the contents to determine a region of the display screen to be augmented.

8. The computer-implemented method of claim 1, where the plurality of participants includes a presenter and at least one viewer.

9. The computer-implemented method of claim 8, wherein the screen sharing session includes a first shared screen image at a computer display viewed by the presenter and a second shared screen image at a computer display viewed by the at least one viewer, and wherein at least one of the first shared screen image and the second shared screen image is augmented to include the contextual relevance data between the contents of the screen sharing session, at least one of the presenter and the at least one viewer, and external data related to the at least one of the presenter and the at least one viewer.

10. The computer-implemented method of claim 9, wherein the viewing step further comprises simultaneously viewing, by the participants, both the contextual relevance data that is relevant to themselves and the contextual relevance data that is relevant to another participant.

11. The computer-implemented method of claim 1, wherein determining contextual relevance data further comprises:

defining the one or more rules for identifying the contents of the screen sharing session; identifying at least one rule from the one or more rules for validating contents against the at least one of the participants;

querying at least one data source for determining contextual relevance data from the external data; and further defining the one or more rules for returning data from the at least one data source and determining from the one or more rules a display format of the augmented screen sharing session.

12. The computer-implemented method of claim 11, wherein text-object recognition techniques are performed to identify particular keywords from the identified contents.

13. A computer-implemented method for determining contextual relevance between shared content of an interactive communication, participants of the interactive communication, and external data related to the participants, the method comprising:

determining a type of content object from the shared content;

communicating with a data source and using one or more rules to identify contextual relevance data that is contextually relevant to at least one of the participants and a type of content object, the contextual relevance data including data related to a contextual relationship between a result of a scan of a screen sharing session and the at least one of the participants, and a modification of the shared content;

outputting the contextual relevance data from the data source to an electronic display for each of the participants; and simultaneously displaying, at a location on the electronic display of at least one participant, both contextual relevance data that is relevant to the at least one participant and contextual relevance data that is relevant to another participant, wherein the contextual relevance data that is relevant to the at least one participant is different than the contextual relevance data that is relevant to the another participant, wherein the location of the displayed contextual relevance data is determined by the one or more rules.

14. The computer-implemented method of claim 13, wherein the interactive communication includes a screen sharing session.

15. The computer-implemented method of claim 13, wherein the data source includes a third party data system.

16. The computer-implemented method of claim 13, further comprising:

defining the one or more rules for determining the type of content object;

identifying at least one rule from the one or more rules for validating the determined type of content object with respect to the at least one participant; and querying at least one data source in accordance with the at least one rule for determining contextual relevance data from external data.

17. The computer-implemented method of claim 16, further comprising:

defining at least one rule for outputting the contextually relevant data from the data source; and determining from the at least one rule a display format for augmenting the interactive communication according to the contextually relevant external data.

\* \* \* \* \*